(12) United States Patent
Wong

(10) Patent No.: US 12,311,499 B2
(45) Date of Patent: May 27, 2025

(54) FIXTURE AND METHOD FOR POLISHING FIBER OPTIC CONNECTOR

(71) Applicant: Senko Advanced Components, Inc., Hudson, MA (US)

(72) Inventor: Kim Man Wong, Kowloon (HK)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 18/481,531

(22) Filed: Oct. 5, 2023

(65) Prior Publication Data

US 2024/0033879 A1 Feb. 1, 2024

Related U.S. Application Data

(63) Continuation of application No. 16/688,966, filed on Nov. 19, 2019, now Pat. No. 11,806,831.

(Continued)

(51) Int. Cl.
*B24B 41/06* (2012.01)
*B24B 13/00* (2006.01)
*G02B 6/38* (2006.01)

(52) U.S. Cl.
CPC .......... *B24B 41/06* (2013.01); *B24B 13/0043* (2013.01); *G02B 6/3863* (2013.01)

(58) Field of Classification Search
CPC ... G02B 6/3863; B24V 41/06; B24V 13/0043
See application file for complete search history.

(56) References Cited

U.S. PATENT DOCUMENTS

| 3,721,945 A | 3/1973 | Hulls |
| 4,150,790 A | 4/1979 | Potter |

(Continued)

FOREIGN PATENT DOCUMENTS

| CA | 2495693 A1 | 4/2004 |
| CN | 2836038 Y | 11/2006 |

(Continued)

OTHER PUBLICATIONS

Fiber Optic Interconnect Solutions, Tactical Fiber Optic Connector Cables and Termini, 2006, Glenair, Inc. Glendale, California.

(Continued)

*Primary Examiner* — Tina M Wong

(57) ABSTRACT

A method of polishing an optical fiber connector comprises providing a unitary connector housing defining an interior containing a first ferrule and a second ferrule, each ferrule having an angle-polished end face and being located in an original rotational position, the unitary connector housing comprising a perimeter wall extending 360° about the interior, first and second ferrule springs biasing the first and second ferrules forward in the interior of the unitary housing, the unitary connector housing having a contiguous two-ferrule opening through a front end of the unitary connector housing, each of the first and second ferrules extending through the contiguous two-ferrule opening such that the first and second ferrules protrude forwardly from the front end of the unitary connector housing; and using a tool to rotate the first ferrule in the housing about a longitudinal axis while the second ferrule remains in the original rotational position.

20 Claims, 12 Drawing Sheets

Related U.S. Application Data

(60) Provisional application No. 62/770,679, filed on Nov. 21, 2018.

(56) References Cited

U.S. PATENT DOCUMENTS

| | | |
|---|---|---|
| 4,327,964 A | 5/1982 | Haesly |
| 4,478,473 A | 10/1984 | Frear |
| 4,762,388 A | 8/1988 | Tanaka |
| 4,764,129 A | 8/1988 | Jones |
| 4,840,451 A | 6/1989 | Sampson |
| 4,872,736 A | 10/1989 | Myers |
| 4,979,792 A | 12/1990 | Weber |
| 5,026,138 A | 6/1991 | Boudreau |
| 5,041,025 A | 8/1991 | Haitmanek |
| D323,143 S | 1/1992 | Ohkura |
| 5,212,752 A | 5/1993 | Stephenson |
| 5,265,181 A | 11/1993 | Chang |
| 5,289,554 A | 2/1994 | Cubukciyan |
| 5,317,663 A | 5/1994 | Beard |
| 5,335,301 A | 8/1994 | Newman |
| 5,348,487 A | 9/1994 | Marazzi |
| 5,418,875 A | 5/1995 | Nakano |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenott |
| 5,570,445 A | 10/1996 | Chou |
| 5,588,079 A | 12/1996 | Tanabe |
| 5,602,951 A | 2/1997 | Shiota |
| 5,684,903 A | 11/1997 | Kyomasu |
| 5,687,268 A | 11/1997 | Stephenson |
| 5,781,681 A | 7/1998 | Manning |
| 5,845,036 A | 12/1998 | De Marchi |
| 5,915,987 A | 6/1999 | Reed |
| 5,937,130 A | 8/1999 | Amberg |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,095,862 A | 8/2000 | Doye |
| 6,134,370 A | 10/2000 | Childers |
| 6,178,283 B1 | 1/2001 | Weigel |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,240,228 B1 | 5/2001 | Chen |
| 6,247,849 B1 | 6/2001 | Liu |
| 6,250,817 B1 | 6/2001 | Lampert et al. |
| 6,276,840 B1 | 8/2001 | Weiss |
| 6,364,537 B1 | 4/2002 | Maynard |
| 6,379,052 B1 | 4/2002 | de Jong |
| 6,422,759 B1 | 7/2002 | Kevern |
| 6,450,695 B1 | 9/2002 | Matsumoto |
| 6,461,054 B1 | 10/2002 | Iwase |
| 6,471,412 B1 | 10/2002 | Belenkiy |
| 6,478,472 B1 | 11/2002 | Anderson |
| 6,485,194 B1 | 11/2002 | Shirakawa |
| 6,530,696 B1 | 3/2003 | Ueda |
| 6,551,117 B2 | 4/2003 | Poplawski |
| 6,565,262 B2 | 5/2003 | Childers |
| 6,579,014 B2 | 6/2003 | Melton |
| 6,585,194 B1 | 7/2003 | Brhwood |
| 6,634,796 B2 | 10/2003 | de Jong |
| 6,634,801 B1 | 10/2003 | Waldron |
| 6,648,520 B2 | 11/2003 | McDonald |
| 6,668,113 B2 | 12/2003 | Togami |
| 6,682,228 B2 | 1/2004 | Rathnam |
| 6,685,362 B2 | 2/2004 | Burkholder |
| 6,695,486 B1 | 2/2004 | Falkenberg |
| 6,811,321 B1 | 11/2004 | Schmalzigaug et al. |
| 6,854,894 B1 | 2/2005 | Yunker |
| 6,869,227 B2 | 3/2005 | Del Grosso |
| 6,872,039 B2 | 3/2005 | Ba |
| 6,935,789 B2 | 8/2005 | Gross, III |
| 7,036,993 B2 | 5/2006 | Luther |
| 7,052,186 B1 | 5/2006 | Bates |
| 7,077,576 B2 | 7/2006 | Luther |
| 7,090,407 B2 | 8/2006 | Melton |
| 7,091,421 B2 | 8/2006 | Kukita |
| 7,111,990 B2 | 9/2006 | Melton |
| 7,113,679 B2 | 9/2006 | Melton |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,198,409 B2 | 4/2007 | Smith |
| 7,207,724 B2 | 4/2007 | Gurreri |
| D543,124 S | 5/2007 | Raatikainen |
| D543,146 S | 5/2007 | Chen |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien |
| 7,315,682 B1 | 1/2008 | En Lin |
| 7,325,976 B2 | 2/2008 | Gurreri |
| 7,325,980 B2 | 2/2008 | Martin |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin |
| 7,431,604 B2 | 10/2008 | Waters |
| 7,463,803 B2 | 12/2008 | Cody |
| 7,465,180 B2 | 12/2008 | Kuda |
| 7,473,124 B1 | 1/2009 | Briant |
| 7,510,335 B1 | 3/2009 | Su |
| 7,513,695 B1 | 4/2009 | Lin |
| 7,540,666 B2 | 6/2009 | Luther |
| 7,561,775 B2 | 7/2009 | Lin |
| 7,588,373 B1 | 9/2009 | Sato |
| 7,591,595 B2 | 9/2009 | Lu |
| 7,594,766 B1 | 9/2009 | Sasser |
| 7,641,398 B2 | 1/2010 | O'Riorden |
| 7,695,199 B2 | 4/2010 | Teo |
| 7,699,533 B2 | 4/2010 | Milette |
| 7,712,970 B1 | 5/2010 | Lee |
| 7,824,113 B2 | 11/2010 | Wong |
| 7,837,395 B2 | 11/2010 | Lin |
| D641,708 S | 7/2011 | Yamauchi |
| 8,083,450 B1 | 12/2011 | Smith |
| 8,152,385 B2 | 4/2012 | de Jong |
| 8,186,890 B2 | 5/2012 | Liu |
| 8,192,091 B2 | 6/2012 | Hsu |
| 8,202,009 B2 | 6/2012 | Lin |
| 8,221,007 B2 | 7/2012 | Peterhans |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,465,317 B2 | 6/2013 | Gniadek |
| 8,534,928 B2 | 9/2013 | Cooke |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel |
| 8,651,749 B2 | 2/2014 | Junior |
| 8,676,022 B2 | 3/2014 | Jones |
| 8,678,670 B2 | 3/2014 | Takahashi |
| 8,727,638 B2 | 5/2014 | Lee |
| 8,770,863 B2 | 7/2014 | Cooke |
| 9,052,474 B2 | 6/2015 | Jiang |
| 9,250,402 B2 | 2/2016 | Ishil |
| 9,310,569 B2 | 4/2016 | Lee |
| 9,366,829 B2 | 6/2016 | Czosnowski |
| 9,411,110 B2 | 8/2016 | Barnette, Jr. |
| 9,448,370 B2 | 9/2016 | Xue et al. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |

(56) References Cited

U.S. PATENT DOCUMENTS

| | | |
|---|---|---|
| 9,557,495 B2 | 1/2017 | Raven |
| 9,568,686 B2 | 2/2017 | Fewkes |
| 9,581,768 B1 | 2/2017 | Baca |
| 9,599,778 B2 | 3/2017 | Wong |
| 9,658,409 B2 | 5/2017 | Gniadek |
| 9,684,130 B2 | 6/2017 | Vaetch et al. |
| 9,684,136 B2 | 6/2017 | Cline |
| 9,684,313 B2 | 6/2017 | Chajec |
| 9,709,753 B1 | 7/2017 | Chang |
| 9,778,425 B2 | 10/2017 | Nguyen |
| 9,829,644 B2 | 11/2017 | Nguyen |
| 9,829,645 B2 | 11/2017 | Good |
| 9,829,653 B1 | 11/2017 | Nishiguchi |
| 9,869,825 B2 | 1/2018 | Bailey |
| 9,880,361 B2 | 1/2018 | Childers |
| 9,946,035 B2 | 4/2018 | Gtafson |
| 9,971,103 B2 | 5/2018 | de Jong |
| 10,031,296 B2 | 7/2018 | Good |
| 2002/0168148 A1 | 11/2002 | Gililand et al. |
| 2002/0172467 A1 | 11/2002 | Anderson |
| 2002/0191919 A1 | 12/2002 | Nolan |
| 2003/0053787 A1 | 3/2003 | Lee |
| 2003/0063862 A1 | 4/2003 | Fillion |
| 2003/0157825 A1 | 8/2003 | Kane |
| 2004/0052473 A1 | 3/2004 | Seo |
| 2004/0109646 A1 | 6/2004 | Anderson |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0247252 A1 | 12/2004 | Ehrenreich |
| 2005/0111796 A1 | 5/2005 | Matasek |
| 2005/0141817 A1 | 6/2005 | Yazaki |
| 2006/0013539 A1 | 1/2006 | Thaler |
| 2006/0089049 A1 | 4/2006 | Sedor |
| 2006/0127025 A1 | 6/2006 | Haberman |
| 2006/0160429 A1 | 7/2006 | Dawiedczyk |
| 2006/0193562 A1 | 8/2006 | Theuerkorn |
| 2006/0269194 A1 | 11/2006 | Luther |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kwitsch |
| 2008/0044137 A1 | 2/2008 | Luther |
| 2008/0069501 A1 | 3/2008 | Mudd |
| 2008/0101757 A1 | 5/2008 | Lin |
| 2008/0226237 A1 | 9/2008 | O'Riorden |
| 2008/0267566 A1 | 10/2008 | En Lin |
| 2009/0022457 A1 | 1/2009 | de Jong |
| 2009/0028507 A1 | 1/2009 | Jones |
| 2009/0047818 A1 | 2/2009 | Irwin |
| 2009/0092360 A1 | 4/2009 | Lin |
| 2009/0176401 A1 | 7/2009 | Gu |
| 2009/0196555 A1 | 8/2009 | Lin |
| 2009/0214162 A1 | 8/2009 | O'Riorden |
| 2009/0220197 A1 | 9/2009 | Gniadek |
| 2009/0220200 A1 | 9/2009 | Sheau Tung Wong |
| 2009/0290839 A1 | 11/2009 | Lin |
| 2009/0290938 A1 | 11/2009 | Asaoka |
| 2010/0034502 A1 | 2/2010 | Lu |
| 2010/0054668 A1 | 3/2010 | Nelson |
| 2010/0092136 A1 | 4/2010 | Nhep |
| 2010/0247041 A1 | 9/2010 | Szilagyi |
| 2010/0061069 A1 | 11/2010 | Cole |
| 2010/0284656 A1 | 11/2010 | Morra |
| 2010/0322561 A1 | 12/2010 | Lin |
| 2011/0044588 A1 | 2/2011 | Larson |
| 2011/0131801 A1 | 6/2011 | Nelson |
| 2011/0155810 A1 | 6/2011 | Taniguchi |
| 2011/0177710 A1 | 7/2011 | Tobey |
| 2011/0239220 A1 | 9/2011 | Gibson |
| 2012/0099822 A1 | 4/2012 | Kuffel |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2012/0301080 A1 | 11/2012 | Gniadek |
| 2013/0019423 A1 | 1/2013 | Srutkowski |
| 2013/0071067 A1 | 3/2013 | Lin |
| 2013/0089995 A1 | 4/2013 | Gniadek |
| 2013/0094816 A1 | 4/2013 | Lin |
| 2013/0121653 A1 | 5/2013 | Shitama |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0259429 A1 | 10/2013 | Czosnowski |
| 2013/0308915 A1 | 11/2013 | Buff |
| 2013/0322825 A1 | 12/2013 | Cooke |
| 2014/0016901 A1 | 1/2014 | Lambourn |
| 2014/0023322 A1 | 1/2014 | Gniadek |
| 2014/0050446 A1 | 2/2014 | Chang |
| 2014/0056562 A1 | 2/2014 | Limbert |
| 2014/0133808 A1 | 4/2014 | Hill |
| 2014/0219621 A1 | 8/2014 | Barnette |
| 2014/0226946 A1 | 8/2014 | Cooke |
| 2014/0241644 A1 | 8/2014 | Kang |
| 2014/0241678 A1 | 8/2014 | Bringuier |
| 2014/0241688 A1 | 8/2014 | Isenhour |
| 2014/0334780 A1 | 11/2014 | Nguyen |
| 2014/0348477 A1 | 11/2014 | Chang |
| 2014/0370021 A1 | 12/2014 | Lazar et al. |
| 2015/0003788 A1 | 1/2015 | Chen |
| 2015/0111417 A1 | 4/2015 | Vanderwood |
| 2015/0198766 A1 | 7/2015 | Takahashi et al. |
| 2015/0212282 A1 | 7/2015 | Lin |
| 2015/0241644 A1 | 8/2015 | Lee |
| 2015/0301294 A1 | 10/2015 | Chang |
| 2015/0331201 A1 | 11/2015 | Takano |
| 2015/0355417 A1 | 12/2015 | Takano |
| 2015/0378113 A1 | 12/2015 | Good |
| 2016/0131849 A1 | 5/2016 | Takano |
| 2016/0138343 A1 | 5/2016 | Dean, Jr. et al. |
| 2016/0172852 A1 | 6/2016 | Tamura |
| 2016/0178852 A1 | 6/2016 | Takano |
| 2016/0291262 A1 | 6/2016 | Chang |
| 2016/0195682 A1 | 7/2016 | Takano |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0349458 A1 | 12/2016 | Murray |
| 2016/0370545 A1 | 12/2016 | Jiang |
| 2017/0003458 A1 | 1/2017 | Gniadek |
| 2017/0205587 A1 | 7/2017 | Chang et al. |
| 2017/0205590 A1 | 7/2017 | Bailey et al. |
| 2017/0205591 A1 | 7/2017 | Takano et al. |
| 2017/0212316 A1 | 7/2017 | Takano et al. |
| 2017/0276887 A1 | 9/2017 | Allen |
| 2017/0277059 A1 | 9/2017 | Miura |
| 2017/0343740 A1 | 11/2017 | Nguyen |
| 2018/0156988 A1 | 6/2018 | Gniadek et al. |
| 2018/0172923 A1 | 6/2018 | Bauco et al. |
| 2019/0250344 A1 | 8/2019 | Takano |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| EP | 1245980 B1 | 6/2006 |
| EP | 1566674 B1 | 5/2009 |
| GB | 2111240 A | 6/1983 |
| GB | 2111240 B | 9/1985 |
| JP | 2009229545 A | 10/2009 |

(56) References Cited

FOREIGN PATENT DOCUMENTS

| | | |
|---|---|---|
| JP | 2009276493 A | 11/2009 |
| TW | 200821653 A | 5/2008 |
| WO | 2001/079904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A2 | 2/2014 |
| WO | 2014/182351 A1 | 11/2014 |
| WO | 2015/191024 A1 | 12/2015 |
| WO | 2015/148741 A1 | 9/2016 |

OTHER PUBLICATIONS

Fiber Optic Connectors and Assemblies Catalog, 2009, Huber & Suhner Fiber Optics, Herisau, Switzerland.
Fiber Optic Products Catalog, Nov. 2007, Tyco Electronics Coporation, Harrisburg, Pennsylvania.
Fiber Optic Connectors Tutorial, 2018, 20 pages.
Fiber Optic Glossary, Feb. 29, 2016, 93 pages.
ISR for PCT/US2019/013861, Apr. 8, 2019, 3 pages.
WO for PCT/US2019/013861, Apr. 8, 2019, 11 pages.
Corning Optical Communications Gmbh & Co., "The Value of the Corning OptiTap Connector," CRR-455-A4-BEN, Nov. 2018, 4 pages.

100

10a
10b

200

Assembly →

1   12   2   10a   3

12

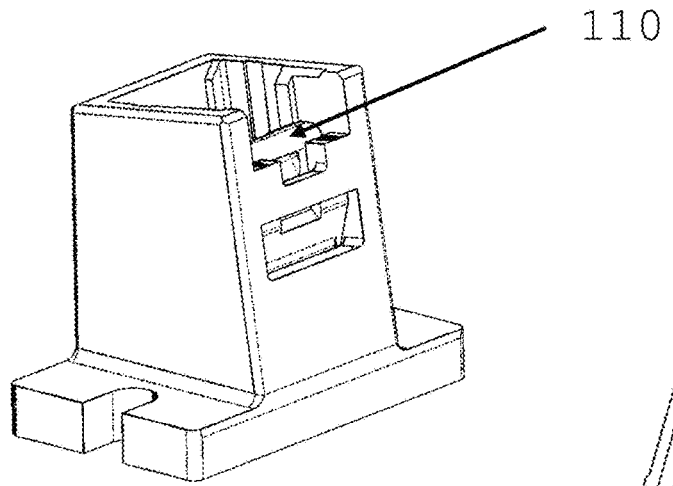
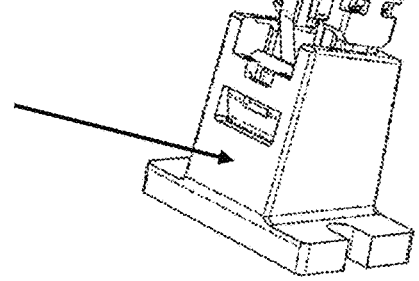
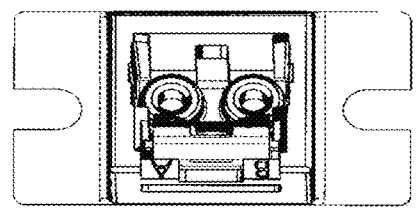
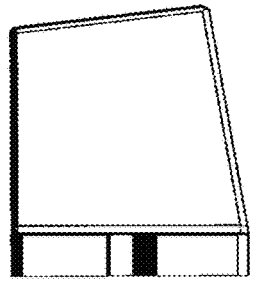
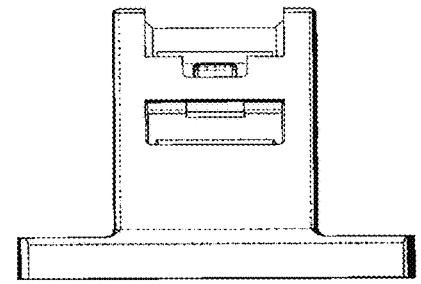
FIG. 5A
FIG. 5B
FIG. 5C1
FIG. 5C2
FIG. 5C3

```
Back Reflection Type    Power Loss(micro Watt)
(ferrule face end cut)

Flat (<-30 dB)             1000
PC   (<-35 dB)              320
UPC  (<-55 dB)                3.2
APC  (<-65 dB)                0.32
```

FIG. 11A
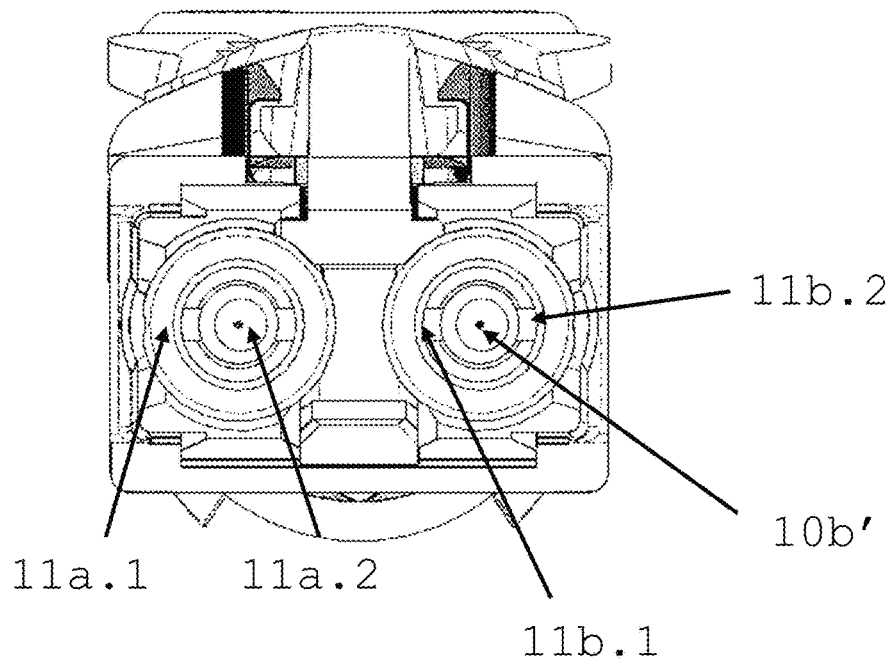
FIG. 11B
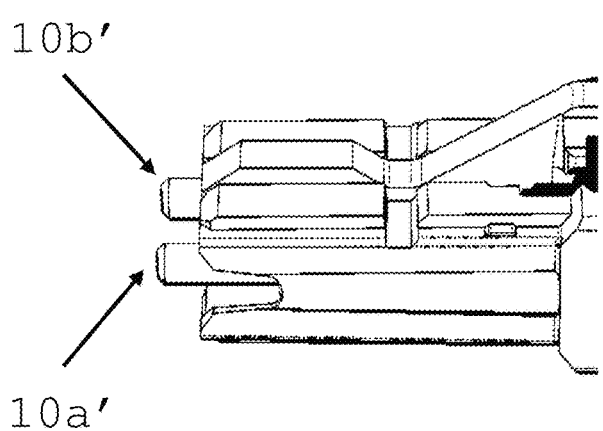
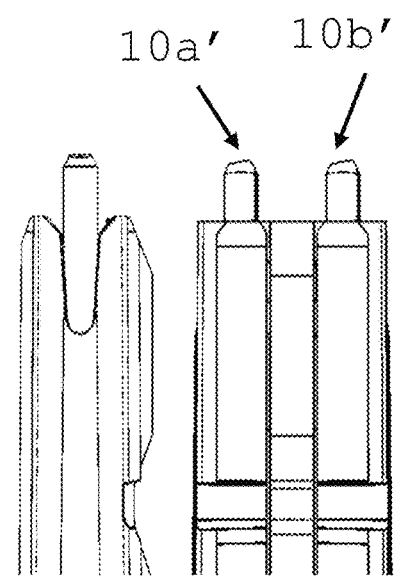
FIG. 11C

FIXTURE AND METHOD FOR POLISHING FIBER OPTIC CONNECTOR

CROSS-REFERENCES TO RELATED APPLICATIONS

This application is a continuation of Ser. No. 16/688,966 filed on Nov. 19, 2019 titled "FIXTURE AND METHOD FOR POLISHING FIBER OPTIC CONNECTOR FERRULES" which claims priority under 35 USC 109(e) to provisional application 62/770,679 filed on Nov. 21, 2018, titled "FIXTURE FOR POLISHING A FIBER OPTIC CONNECTOR HAVING A PLURAL OF FERRULES AND METHOD OF USE", which is fully incorporated herein by reference.

FIELD OF THE INVENTION

The present invention relates to fiber optic connectors and receptacles, and more particularly, to a holder and tool for polishing and orienting a plural of ferrules.

BACKGROUND OF THE INVENTION

Modern high capacity optical systems have multiple connection points in an optical path. Each connection point can lose up to 2 dB of signal or 1 dB of signal per a connector. Since an interconnect point as opposing connectors, there is up to 2 dB of signal loss. 2 db of signal loss translates into a power loss of 1.58 milli-Watt. Reducing signal loss at the connector is important when a system can hundreds of inter-connect junctions, or connector-to-connector points. To achieve a reduced loss, reflection losses that occur between the end face of opposing ferrules can be reduced. Refer to FIG. 9. An APC connector or angled polished connector exhibits the lowest loss at 0.316 micro-watts or opposed to 1000 micro-watts for a flat cut of a ferrule end face for two opposing ferrules in an adapter. To achieve this low loss, the ferrule end is polished to an angle of eight (8) degrees. The prior art methods existing for single ferrule connectors but not duplex ferrule or quad ferrule connectors.

SUMMARY OF THE INVENTION

According to the present invention, a holder with a body portion is configured to hold a duplex fiber optic connector. A duplex connector has at least two ferrules surfaces requiring polishing at an APC cut. APC is called angled polished cut. In use, the connector is positioned in the holder such that the ferrule end faces can be both polished to an eight (8) degree cut. Once the ferrule end faces are polished, a tool is needed to rotate or orient the ferrule end faces about ninety (90) degrees. This is orientation will allow opposing connectors to abut at their end faces, so as to minimize reflection loss, as shown in FIG. 12.

A receptacle is configured to accept a fiber optic connector, and secure said connector therein. An adapter has two opposing receptacles to interconnect two portions of a network. A first connector with a APC end face is inserted into a first receptacle, and a second connector with an APC end face is inserted in the second or opposing receptacle to the first. This forms the joint or interconnect point in a network that is suspect to a 2 decibel signal loss. By abutting opposing end faces with an APC polish over a flat polish at the end face, reflection power losses drop from 1000 micro-watts to 0.32 micro-watts.

BRIEF DESCRIPTION OF THE DRAWINGS

Embodiments of the invention are described in more detail hereinafter with reference to the drawings, in which:

FIG. 5A is a holder or jog for the connector of FIG. 1.

FIG. 5B is the connector of FIG. 1 secured in the holder of FIG. 5A.

FIG. 5C1 is a top view of FIG. 5A holder.

FIG. 5C2 is a side view of FIG. 5A holder.

FIG. 5C3 is a front view of FIG. 5A holder.

FIG. 5C4 is a view of a hook to secure connector of FIG. 1 within holder of FIG. 5C1.

FIG. 11A depicts proper orientation of the APC polished ferrules.

FIG. 11B is a side, front perspective view of the ferrules of FIG. 11A.

FIG. 11C depicts bottom view of ferrules after APC polish and orientation.

DETAILED DESCRIPTION

Figure 12:
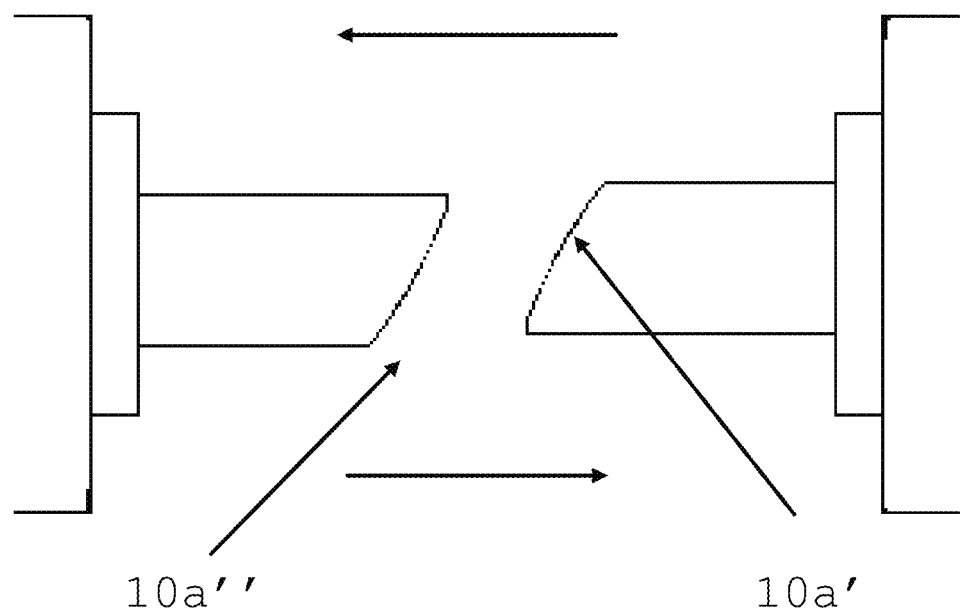
FIG. 12 depicts abutting two APC ferrule end faces to achieve minimal reflection loss.

In the following description, apparatuses for mating two multi-fiber optic ferrules. The ferrules end face being formed of an APC cut, as shown in FIG. 12. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
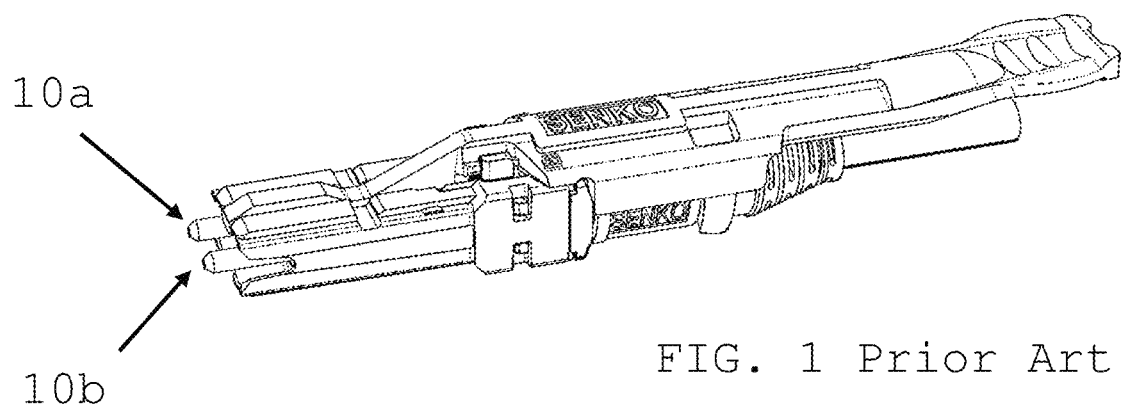
FIG. 1 depicts a prior art duplex ferrule connector.
Figure 2:
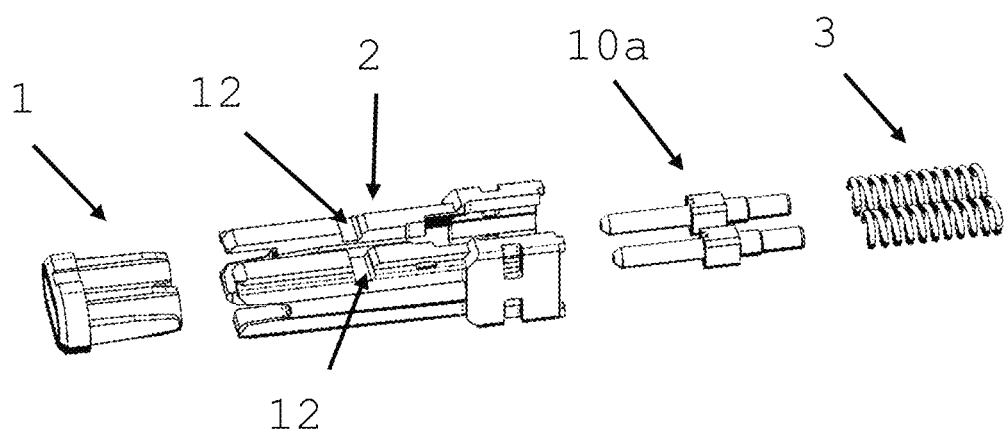
FIG. 2 is an exploded view of FIG. 1.

FIG. 1 depicts a prior art connector 100 having a plural of ferrule assembly (10a, 10b). FIG. 2 is an exploded view of connector 100 depicting bias springs 3, ferrule assembly (10a, 10b), connector housing 2, recess 12, and a dust cap 1.

Figure 2A:
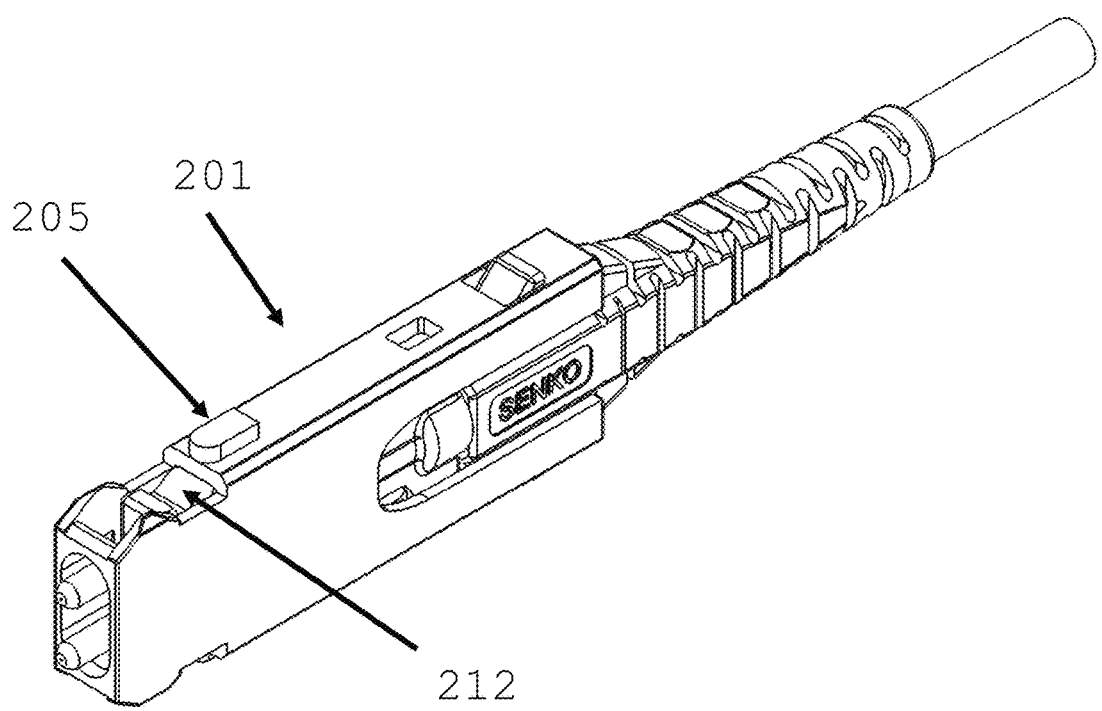
FIG. 2A is a perspective view of an alternative duplex ferrule connector.

FIG. 2A is an alternative duplex ferrule connector 200 with a connector housing 201, alignment tab 205 and recess 212. As with connector 100, connector 200 recess is secured by a latch with holder 500. Connector 200 has an alignment tab 205 which aids in placement of connector 200 within holder 500.

Figure 3:
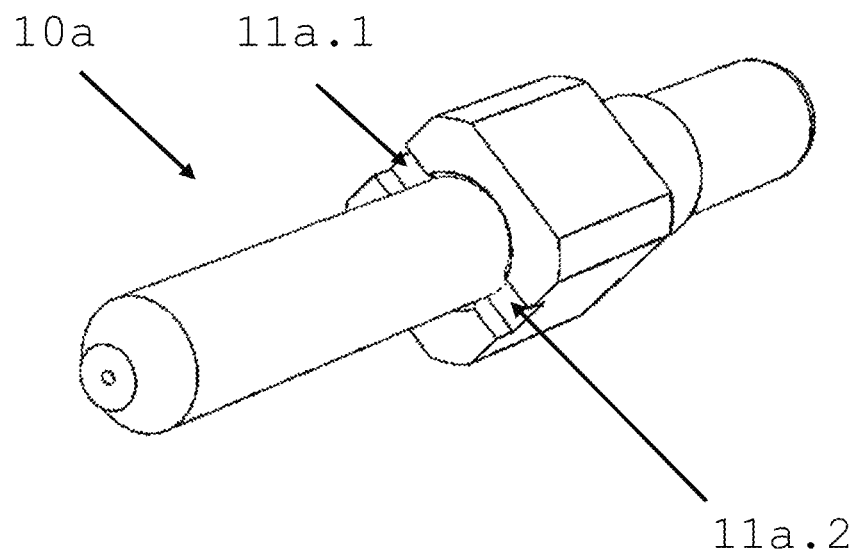
FIG. 3 is a perspective view of a ferrule assembly according to the present invention.
Figure 4:
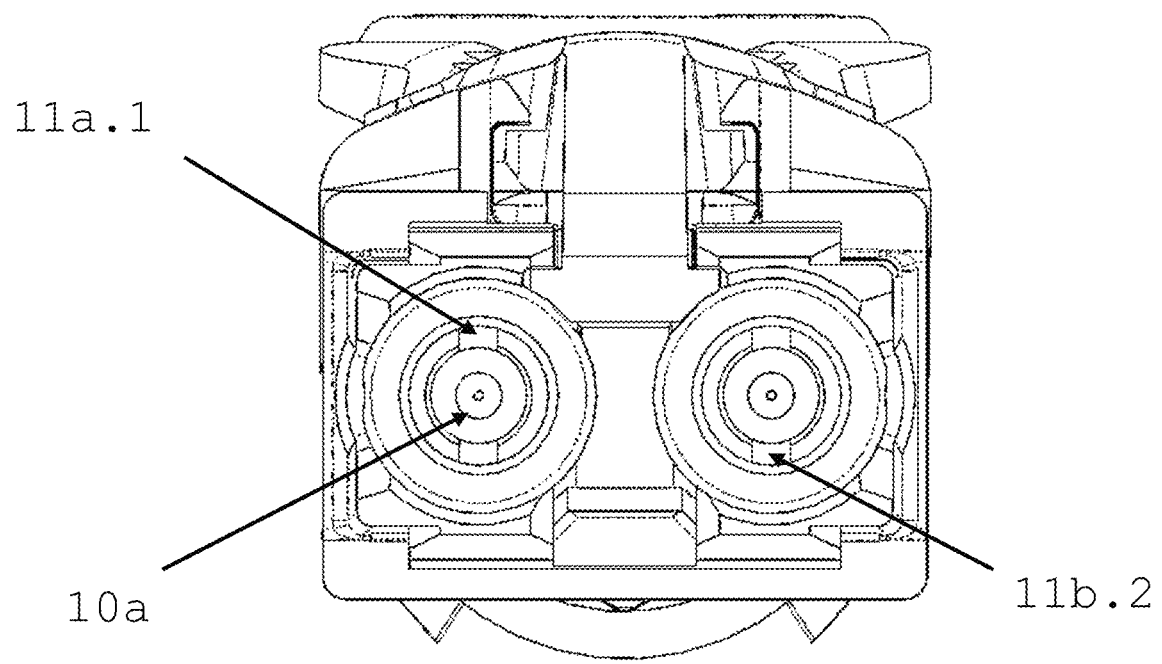
FIG. 4 is a front or proximal view of FIG. 1 connector with FIG. 3 ferrule assembly.
Figure 8A:
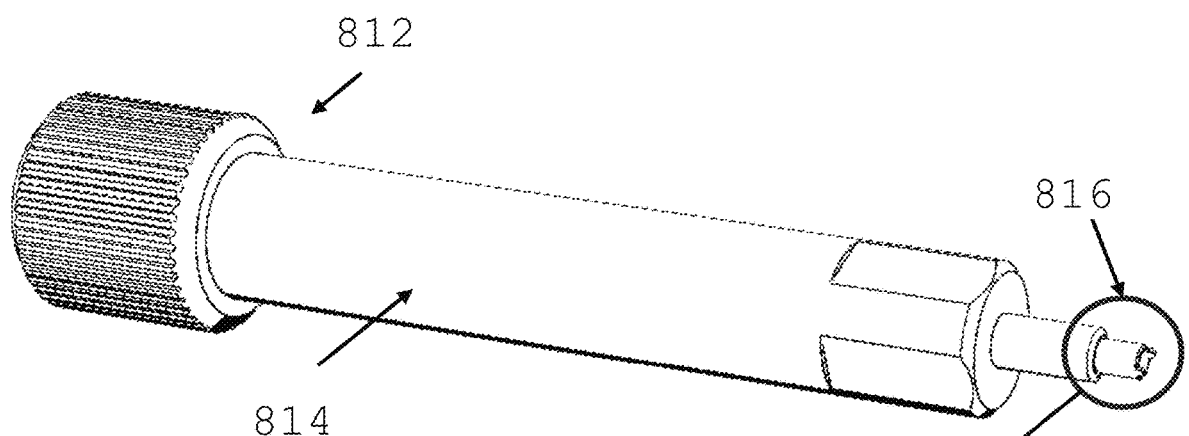
FIG. 8A is a tool to orient the ferrule assembly of FIG. 3 after the ferrule is APC polished.

FIG. 3 depicts a ferrule assembly with a ferrule having an optical fiber therein, and a flange with a pair of opposing slot cut outs (11a.1, 11a.2). FIG. 4 depicts an end view or proximal view of connector 100 showing the ferrule assembly 10a, 10b and slot cutouts 11a.1, 11a.2 and 11b.1, 11b.2 respectively. The slot cut outs accept a corresponding protrusion at a second end of a tool as shown in FIG. 8A.

FIG. 5A is a holder or jig that accepts connector 100 in a configuration capable of applying an APC polish to both ferrule end faces at the same time. An APC polish places an 8 degree angle on a flat-end face ferrule. Prior art polishing is one ferrule at a time. The jig holds the connector at an 8 degree angle. The jig is secured to the face of a polishing surface, using a pair of tabs at the base of the holder. FIG. 5B depicts connector 100 in holder 500. FIG. 5C1 is a top view of holder 500. FIG. 5C2 is a side view of holder 500. FIG. 5C3 is a front view of holder 500.

FIG. 5C4 depicts a hook comprising a body, holder 500 locking surfaces 114, and flexible arms 112. The arms 112 flex upward and are received in a recess 12 of connector upon insertion of connector 100 into holder 500. locking surfaces 114 aid in securing hook 110 within cut-outs (not shown) within holder.

Figure 6:
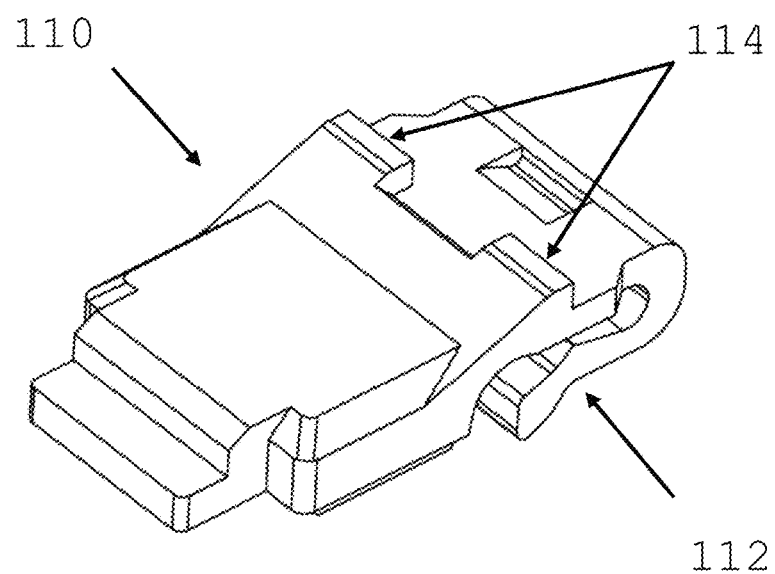
FIG. 6 is a prior art polishing jig for a single ferrule connector.
Figure 6:
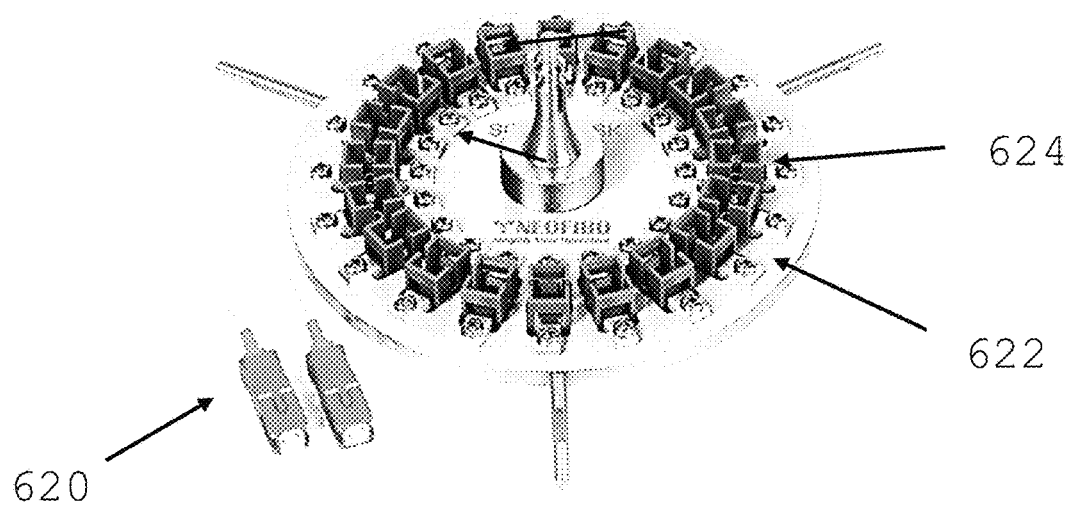

FIG. 6 is a prior art polishing jig 600 with a plural of holders 624 for securing a connector 620 with a single ferrule. By contrast, the present invention is a jig that can hold APC polish two or more ferrules. The jig can be attached to the polisher surface 622 similar to holder 624.

Figure 7A:
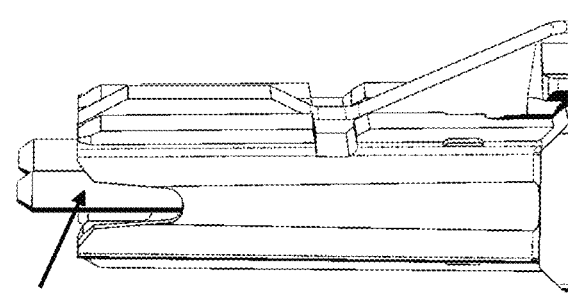
FIG. 7A is the connector of FIG. 1 with its ferrule end faces polished to APC or 8 degree angle.
Figure 7B:
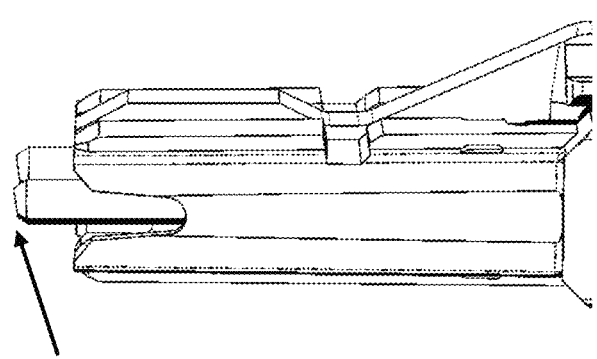
FIG. 7B is the connector of FIG. 1 after APC polishing.
Figure 7C:
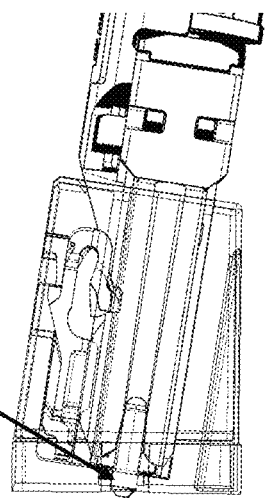
FIG. 7C is the full insertion of the FIG. 1 connector within holder of FIG. 5A.
Figure 7D:
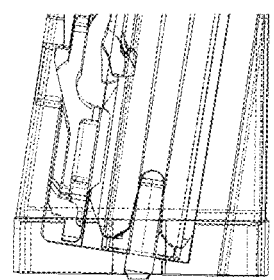
FIG. 7D is the connector of FIG. 1 after APC polishing.
Figure 7E:
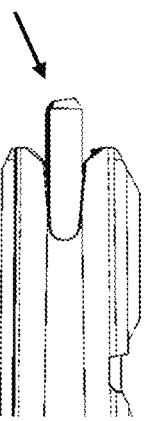
FIG. 7E is a side view and top view of ferrules after APC polishing.
Figure 7E:
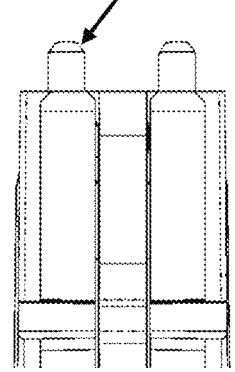

FIG. 7A depicts connector 100 without an APC polish at the ferrule 10a. FIG. 7B depicts connector 100 with an APC polish applied to ferrule 10a'. FIG. 7C depicts connector 100 within jig 500 prior to applying an APC polish. FIG. 7D is a connector 100 after an APC polish is applied to ferrule 10a'. FIG. 7E depicts side view and top view of polish applied to ferrule tip 10a'.

Figure 8B:
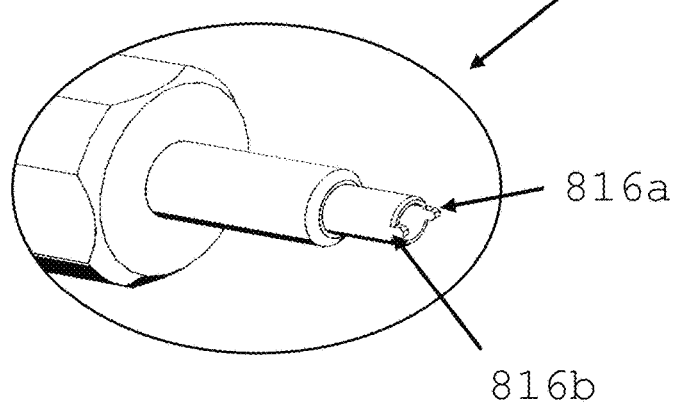
FIG. 8B is an exploded view of a second end of FIG. 8A tool.

FIG. 8A is an orienting tool 800 that rotates an APC polished ferrule 10a', at the proximal end of connector 100. A first end comprises a handle 812 and a second end comprises a tip with a pair of protrusions (816a, 816b), connected by shaft 814. FIG. 8B is an exploded view of tip showing the protrusions.

Figure 9:
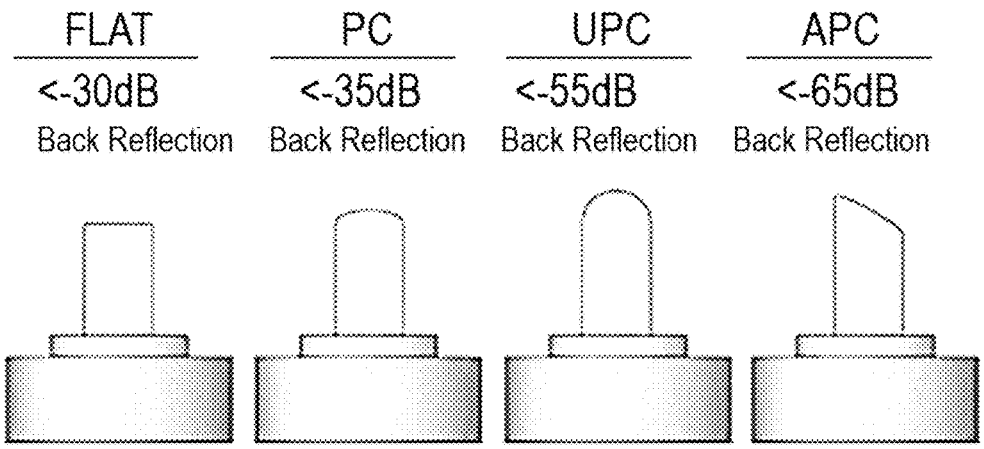
FIG. 9 is a table of reflection losses by end face polish type depicting reflection loss.

FIG. 9 depicts various ferrule end face cuts, and a table of estimated reflection loss in decibels when two ferrules with the same end cut are opposing each other in an adapter. A more negative decibel means less power loss.

Figure 10A:
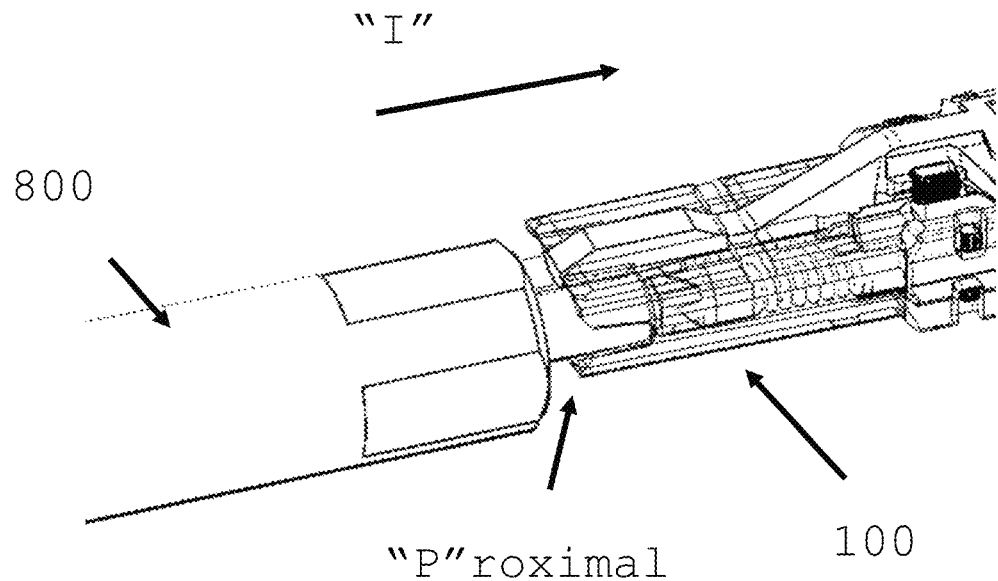
FIG. 10A is FIG. 8A tool secured to ferrule assembly to rotate ferrule after APC polish.
Figure 10B:
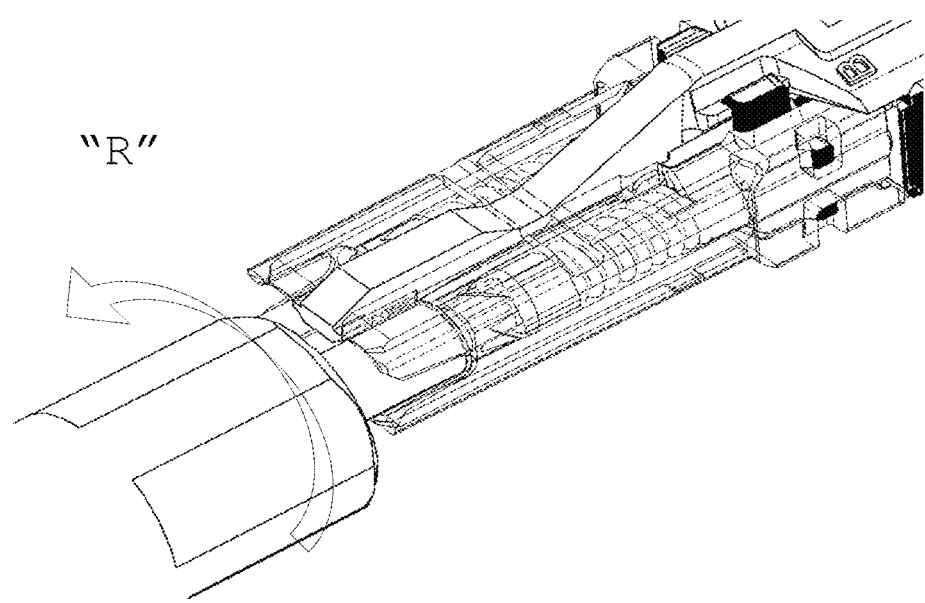
FIG. 10B is rotation step of FIG. 10A.
Figures 10C, 10D:
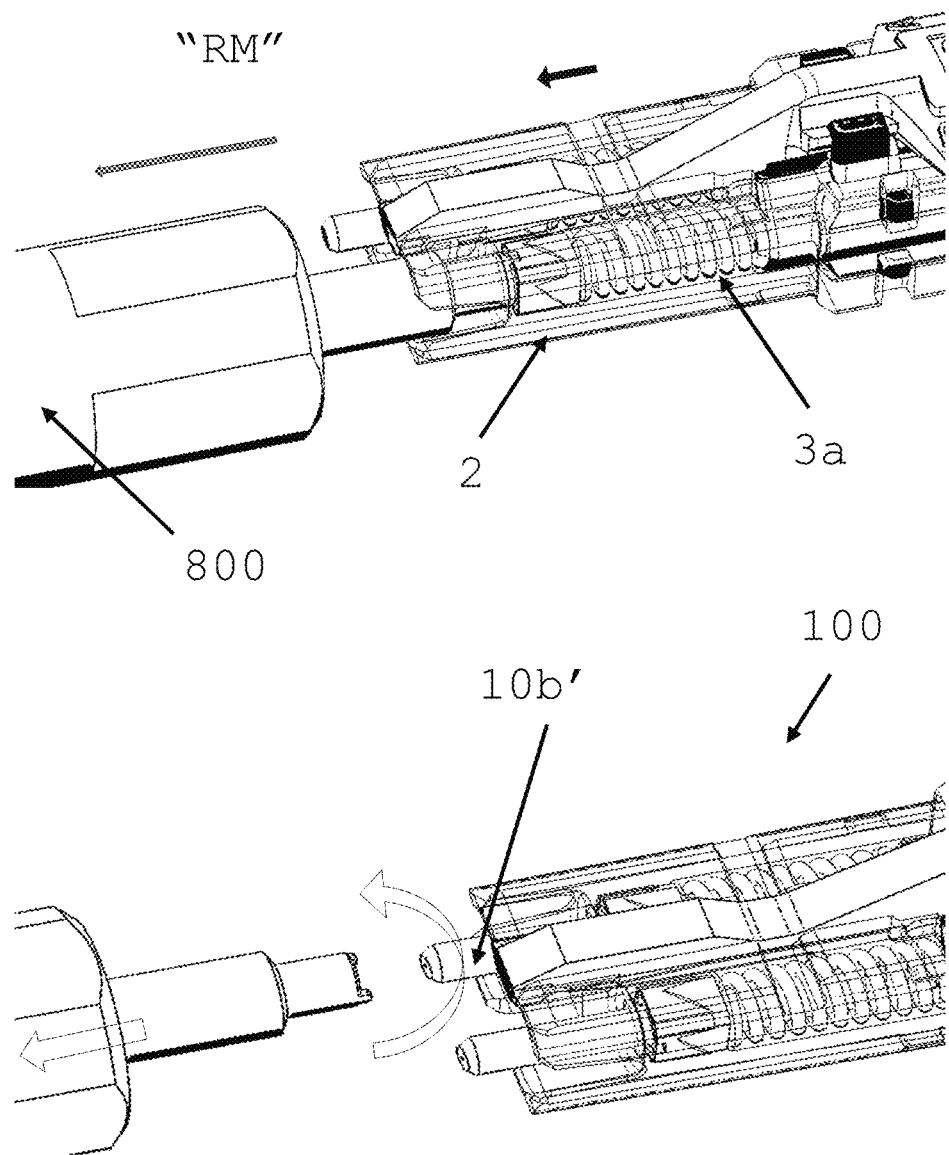
FIG. 10C depicts removing the tool of FIG. 8A off the ferrule.
FIG. 10D depicts rotating the second ferrule.

FIG. 10A depicts tool 800 inserted in the direction "I" and secured to ferrule assembly 10a. The tool protrusions (816a, 816b) engage slot cuts (11a.1, 11a.2) at the proximal end "P", and user pushes the ferrule assembly in a distal direction and rotates ("R") the ferrule assembly 10a', by 90 degrees, in FIG. 10B. In FIG. 10C, the tool 800 is withdrawn proximally, and spring 3a biases ferrule assembly forward ("RM") in connector housing 2. FIG. 10D depicts using tool 800 to rotate the second ferrule assembly (10b') 90 degrees. After both ferrule assembly (10a', 10b') are rotated 90 degrees, the APC cut ferrule end faces are in a proper orientation as shown by FIG. 11A. FIG. 11B depicts side view of polished ferrules to an APC angle of 8 degrees of FIG. 11A. FIG. 11C depicts bottom view of APC ferrules after orientation using tool 800. FIG. 12 depicts abutting or inserting of a two connectors 100 after APC polish in an adapter (not shown). FIG. 12 shows how the APC polished end faces will abut with no air gap to reduce reflection loss, as estimated in FIG. 9.

An ordinarily skilled person in the art can appreciate that by following the principal of the present invention, a version of the adapter for mating a multi-fiber optic ferrule with another multi-fiber optic ferrule can be derived without departing from the scope and spirit of the invention. Although the embodiments of the present invention described herein are related to multi-fiber optic applications, the present invention can be adapted to single fiber optic applications. Specific details may be omitted so as not to obscure the invention; however, the disclosure is written to enable one skilled in the art to practice the teachings herein without undue experimentation.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A duplex optical fiber connector comprising:
   a first ferrule having a first angle-polished end face;
   a second ferrule having a second angle-polished end face; and
   a unitary connector housing assembly defining an interior containing the first ferrule and the second ferrule, the unitary connector housing assembly comprising a perimeter wall extending 360° about the interior, the unitary connector housing assembly having a contiguous two-ferrule opening through a front end of the unitary connector housing, each of the first ferrule and the second ferrule extending through the contiguous two-ferrule opening such that the first and second ferrules protrude forwardly from the front end of the unitary connector housing assembly;
   wherein the first angle-polished end face extends in a first plane and the second angle-polished end face extends in a second plane, the first plane being non-parallel with the second plane;
   wherein, excluding the first ferrule and the second ferrule, the front end of the unitary connector housing assembly defines a front-most point of the duplex optical fiber connector.

2. The duplex optical fiber connector as set forth in claim 1, wherein the first ferrule and the second ferrule are spaced apart along a vertical axis.

3. The duplex optical fiber connector as set forth in claim 2, wherein the unitary connector housing assembly comprises an upper wall portion and a lower wall portion spaced apart along the vertical axis above and below the first and second ferrules, respectively, the unitary connector housing assembly further comprising a left side wall portion and a right side wall portion spaced apart on opposite sides of the first and second ferrules.

4. The duplex optical fiber connector as set forth in claim 3, wherein at least one of the upper wall portion and the lower wall portion defines a latch recess.

5. The duplex optical fiber connector as set forth in claim 4, wherein said at least one of the upper wall portion and the lower wall portion further comprises an alignment tab spaced apart behind the latch recess.

6. The duplex optical fiber connector as set forth in claim 3, wherein at least one of the left side wall portion and the right side wall portion defines a flat exterior side of the unitary connector housing assembly.

7. The duplex optical fiber connector as set forth in claim 6, wherein each of the left side wall portion and the right side wall portion defines a flat exterior side of the unitary connector housing assembly.

8. The duplex optical fiber connector as set forth in claim 3, wherein the duplex optical fiber connector has a height along the vertical axis and a width extending from the first side wall portion to the second side wall portion, the height being at least double the width.

9. The duplex optical fiber connector as set forth in claim 1, wherein the first ferrule and the second ferrule are spaced apart along a horizontal axis, wherein the unitary connector housing assembly comprises an upper wall portion and a lower wall portion spaced apart along a vertical axis perpendicular to the horizontal axis, the upper wall portion being above the first and second ferrules and the lower wall portion being below the first and second ferrules, the unitary connector housing assembly further comprising a left side wall portion and a right side wall portion spaced apart along the horizontal axis on opposite sides of the first and second ferrules.

10. The duplex optical fiber connector as set forth in claim 9, wherein the upper wall portion comprises a recess extending parallel to the horizontal axis, the recess configured to receive a flexible arm of a hook for securing the duplex optical fiber connector within a holder.

11. The duplex optical fiber connector as set forth in claim 10, wherein the upper wall portion further comprises a longitudinal groove extending perpendicular to the recess.

12. The duplex optical fiber connector as set forth in claim 11, further comprising a latch release slidably received in the longitudinal groove, the latch release configured to be pulled backward along the longitudinal groove for lifting the flexible arm of the hook out of the recess.

13. A duplex optical fiber connector comprising:
a first ferrule having a first angle-polished end face;
a second ferrule having a second angle-polished end face; and
a unitary connector housing assembly defining an interior containing the first ferrule and the second ferrule, the unitary connector housing assembly comprising a perimeter wall extending 360° about the interior, the unitary connector housing assembly having a contiguous two-ferrule opening through a front end of the unitary connector housing, each of the first ferrule and the second ferrule extending through the contiguous two-ferrule opening such that the first and second ferrules protrude forwardly from the front end of the unitary connector housing assembly;
wherein the first angle-polished end face extends in a first plane and the second angle-polished end face extends in a second plane, the first plane being non-parallel with the second plane;
wherein at least one of the first ferrule and the second ferrule defines a front-most point of the duplex optical fiber connector and wherein the front-most point is spaced apart forwardly of an entirety of the unitary connector housing assembly.

14. The duplex optical fiber connector as set forth in claim 13, wherein the first ferrule and the second ferrule are spaced apart along a vertical axis and wherein the unitary connector housing assembly comprises an upper wall portion and a lower wall portion spaced apart along the vertical axis above and below the first and second ferrules, respectively, the unitary connector housing assembly further comprising a left side wall portion and a right side wall portion spaced apart on opposite sides of the first and second ferrules.

15. The duplex optical fiber connector as set forth in claim 14, wherein at least one of the upper wall portion and the lower wall portion defines a latch recess.

16. The duplex optical fiber connector as set forth in claim 15, wherein said at least one of the upper wall portion and the lower wall portion further comprises an alignment tab spaced apart behind the latch recess.

17. The duplex optical fiber connector as set forth in claim 14, wherein each of the left side wall portion and the right side wall portion defines a flat exterior side of the unitary connector housing assembly.

18. The duplex optical fiber connector as set forth in claim 14, wherein the duplex optical fiber connector has a height along the vertical axis and a width extending from the first side wall portion to the second side wall portion, the height being at least double the width.

19. The duplex optical fiber connector as set forth in claim 13, wherein the first ferrule and the second ferrule are spaced apart along a horizontal axis, wherein the unitary connector housing assembly comprises an upper wall portion and a lower wall portion spaced apart along a vertical axis perpendicular to the horizontal axis, the upper wall portion being above the first and second ferrules and the lower wall portion being below the first and second ferrules, the unitary connector housing assembly further comprising a left side wall portion and a right side wall portion spaced apart along the horizontal axis on opposite sides of the first and second ferrules.

20. The duplex optical fiber connector as set forth in claim 19, wherein the upper wall portion comprises a recess extending parallel to the horizontal axis, the recess configured to receive a flexible arm of a hook for securing the duplex optical fiber connector within a holder, wherein the upper wall portion further comprises a longitudinal groove extending perpendicular to the recess, and wherein the duplex fiber optic connector further comprises a latch release slidably received in the longitudinal groove, the latch release configured to be pulled backward along the longitudinal groove for lifting the flexible arm of the hook out of the recess.

\* \* \* \* \*